United States Patent Office 3,830,884
Patented Aug. 20, 1974

3,830,884
DIALKYLSULFOXIMINOCARBONYLMETHYL THIOPHOSPHATES AND PROCESS FOR PREPARATION THEREOF
Jacques Perronnet, Paris, André Poittevin, Vaires-sur-Marne, and Jean-Pierre Demoute, Montreuil-sous-Bois, France, assignors to Roussel-UCLAF, Paris, France
No Drawing. Filed Sept. 15, 1972, Ser. No. 289,474
Claims priority, application France, Sept. 27, 1971, 7134629
Int. Cl. C07f 9/16
U.S. Cl. 260—943  6 Claims

ABSTRACT OF THE DISCLOSURE

Dialkylsulfoximinocarbonylmethyl thiophosphates having the formula

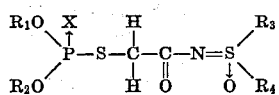

wherein $R_1$, $R_2$, $R_3$ and $R_4$ are alkyl having from 1 to 7 carbon atoms and X represents a member selected from the group consisting of oxygen and sulfur; the process of manufacture, pesticidal compositions and the acaricidal method. The said thiophosphates possess acaricidal properties.

OBJECTS

An object of the present invention is the development of dialkylsulfoximinocarbonylmethyl thiophosphates having the formula

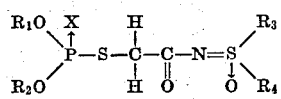

wherein $R_1$, $R_2$, $R_3$ and $R_4$ are alkyl having from 1 to 7 carbon atoms and X represents a member selected from the group consisting of oxygen and sulfur.

Another object of the present invention is the development of a process for the production of the above thiophosphates which consists essentially of reacting an acid halide having the formula

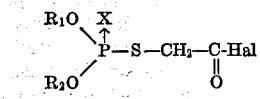

wherein $R_1$ and $R_2$ are alkyl having from 1 to 7 carbon atoms, X represents a member selected from the group consisting of oxygen and sulfur and Hal represents a halogen selected from the group consisting of chlorine and bromine, with a dialkylsulfoximide having the formula

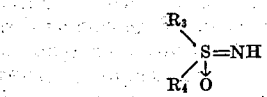

wherein $R_3$ and $R_4$ are alkyl having from 1 to 7 carbon atoms, and recovering said dialkylsulfoximinocarbonylmethyl thiophosphates.

A further object of the present invention is the development of acaricidal compositions containing from 10% to 80% by weight of said dialkylsulfoximinocarbonylmethyl thiophosphates as active principle.

A yet further object of the present invention is the development of a method of combatting acarids comprising contacting acarids with said dialkylsulfoximinocarbonylmethy thiophosphates.

These and other objects of the invention will become more apparent as the description thereof proceeds.

DESCRIPTION OF THE INVENTION

The above objects have been achieved by the development of novel thiophosphates having the formual I

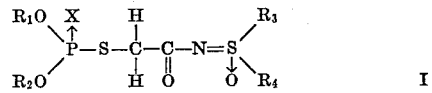

in which $R_1$, $R_2$, $R_3$, and $R_4$ the same or different represent an alkyl having from 1 to 7 carbon atoms and X represents an atom of sulfur or oxygen. Of the thiophosphates of formula I, particularly to be mentioned are:

O,O-dimethyl-S-(dimethylsulfoximinocarbonyl-methyl) dithiophosphate,
O,O-diethyl-S-(dimethylsulfoximinocarbonylmethyl) dithiophosphate, and
O,O-diethyl-S-(dimethylsulfoximinocarbonylmethyl) thiophosphate.

The thiophosphate compounds of formula I are endowed with interesting acaricidal properties. Those acaricidal properties will be demonstrated by tests described later in this description.

The process for the preparation of the thiophosphate compounds of formula I is essentially characterized in that an acid halide compound having the formula II

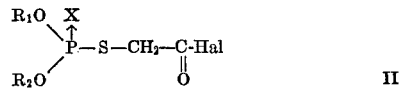

in which $R_1$ and $R_2$, the same or different, represent an alkyl having 1 to 7 carbon atoms, X represents an atom of sulfur or oxygen and Hal represents an atom of chlorine or bromine, is reacted with a dialkylsulfoximide having the formula III

in which $R_3$ and $R_4$, the same or different, represent an alkyl having from 1 to 7 carbon atoms.

In a preferred realization of the process of the invention, the reaction is conducted in the presence of a basic agent, preferably an organic tertiary amine base, such as triethylamine, and in an inert organic solvent such as acetone or tetrahydrofuran.

In the process for the preparation of the thiophosphate compounds of formula I, novel intermediates of the formula II are prepared where X represents oxygen, and more particularly O,O-diethyl - S - (chloroformylmethyl) thiophosphate. The acid halide compounds having the formula II, in which X represents an oxygen atom can be prepared by reacting an alkali metal salt of a thiophosphate having the formula

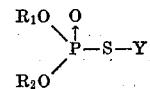

in which $R_1$ and $R_2$ represent an alkyl having from 1 to 7 carbon atoms and Y represents an alkali metal, with a monohalogenated acetic acid having the formula

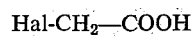

in which Hal represents an atom of chlorine or bromine, thus obtaining a compound having the formula

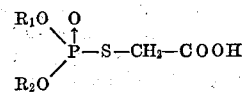

which is transformed into an acid halide by classical methods.

The invention also concerns the acaricidal compositions containing, as active material, one or several compounds of formula I. These compositions can be prepared in the form of powders, granules, suspensions, emulsions, solutions, etc., containing the active principle, for example in admixture with a vehicle and/or anionic, cationic or non-ionic surface-active agent assuring, among other things, a uniform dispersion of these substances in the composition. The vehicle utilized can be a liquid such as water, alcohol, hydrocarbons or other organic solvents, a mineral, animal or vegetable oil, or a powder such as talc, clays, silicates, kieselguhr, etc.

The solid compositions, prepared in the form of powder for powdering, wettable powders, or granules, can be prepared by grinding of the active compound with an inert solid or by impregnation of a solid support with a solution of the active principle in a solvent which is then evaporated.

These compositions ordinarily contain from 10% to 80% by weight of the thiophosphate of formula I, as active principle and the remainder, ordinarily inactive excipients as discussed above. The compositions can contain optionally other pesticides, herbicides and/or fungicides, biocides, insecticides, etc., and substances having influencing properties on the growth of plants.

These compositions are, it is to be understood, applied at doses sufficient in order to exercise their pesticidal, particularily acaricidal, activities. The amount of active material in the compositions varies particularly as a function of the acarids to be destroyed and as the concentrations to be applied. The thiophosphates of formula I are active as acaricides against all forms of the acarids from the egg to adult stage.

The following examples illustrate the invention without limiting the same in any respect.

EXAMPLE 1

O,O-dimethyl-S-(dimethylsulfoximinocarbonylmethyl) dithiophosphate 14.2 gm. of dimethylsulfoximide (described by Bentley et al., J. Chem. Soc., 1950, 2081) were introduced into 150 cc. of tetrahydrofuran. Then, at 0° C. and in fifteen minutes, 36 gm. of the acid chloride of O,O-dimethyl-S-carboxymethyl dithiophosphate (described in Belgium Pat. No. 740,759) and 21.2 ml. of triethylamine were added. The mixture was left under agitation at room temperature for thirty minutes. The precipitate formed was eliminated by filtration and the filtrate was evaporated under reduced pressure. The residue was taken up with chloroform. The chloroform solution was washed three times with 50 cc. of water, dried over sodium sulfate and evaporated under reduced pressure. A brown oil was obtained which was subjected to chromatography through silica eluting with a benzene-acetone-chloroform mixture (1:1:1). 18 gm. of O,O-dimethyl-S-(dimethylsulfoximinocarbonylmethyl) dithiophosphate having a refractive index $n_D^{20.5} = 1.5643$, was obtained.

Analysis: $C_6H_{14}NO_4PS_3$; molecular weight=291.35. Calculated: 24.74% C; 4.84% H; 10.66% P; 4.81% N. Found: 24.5% C; 4.8% H; 10.3% P; 4.9% N.

EXAMPLE 2

O,O-diethyl-S-(dimethylsulfoximinocarbonylmethyl) dithiophosphate 34 gm. of dimethylsulfoximide and 37 gm. of triethylamine were introduced into 200 cc. of tetrahydrofuran. The solution thus obtained was cooled to 5° C. and 98 gm. of the acid chloride of O,O-diethyl-S-(carboxymethyl) dithiophosphate (described in French Pat. 1,588,747), was introduced drop by drop. The mixture was maintained under agitation at room temperature for 48 hours. The precipitate of triethylamine hydrochloride formed was eliminated by filtration. The filtrate was evaporated to dryness. A black oil was obtained which was subject to chromatography through silica eluting with a chloroform-acetone mixture (1:1). 46 gm. of O,O-diethyl-S-(dimethylsulfoximinocarbonylmethyl) dithiophosphate was thus obtained having a refractive index $n_D^{21} = 1.5467$.

Analysis: $C_8H_{18}NO_4PS_3$; molecular weight=319.404. Calculated: 30.09% C; 5.68% H; 4.39% N; 9.70% P. Found: 30.1% C; 5.4% H; 4.0% N; 9.4% P.

EXAMPLE 3

O,O-diethyl-S-(dimethylsulfoximinocarbonylmethyl) thiophosphate 11.5 gm. of dimethylsulfoximide and 12 gm. of triethylamine were introduced into 200 cc. of acetone. The solution thus obtained was cooled to 0° C. and 30 gm. of O,O-diethyl-S-(chloroformylmethyl) thiophosphate, the preparation of which is given later in the present example, was introduced drop by drop. The mixture was agitated for 24 hours at room temperature. The precipitate of triethylamine hydrochloride formed was eliminated by filtration. The filtrate was evaporated to dryness. A red oil was obtained which was subject to chromatography through silica eluting with an acetone-ethanol mixture (1:1). 13 gm. of O,O-diethyl-S-(dimethylsulfoximinocarbonylmethyl) thiophosphate was thus obtained in the form of a red oil having a refractive index $n_D^{27} = 1.5081$.

Analysis: $C_8H_{18}NO_5PS_2$; molecular weight=303.335. Calculated: 31.68% C; 5.98% H; 4.62% N. Found: 32.0% C; 6.2% H; 4.5% N.

Preparation of O,O-diethyl-S-(chloroformylmethyl) thiophosphate

Step A: O,O - diethyl - S - (carboxymethyl) thiophosphate.—47 gm. of monochloroacetic acid were introduced into a solution containing 400 cc. of chloroform and 50 cc. of demineralized water. The solution was heated to reflux and over a period of 30 minutes a solution containing 104 gm. of the potassium salt of O,O-diethyl thiophosphate (described by Mastin et al., J. Am. Chem. Soc., 67, 1662) in 100 cc. of demineralized water was introduced. When the introduction was finished the solution was heated to reflux for a period of one hour and thirty minutes, and then allowed to return to room temperature. The chloroformic phase was separated, dried over sodium sulfate and evaporated to dryness. 91 gm. of O,O-diethyl-S-(carboxymethyl) thiophosphate were obtained.

I.R. spectra: C=O 1725 cm.$^{-1}$.

Step B: O,O - diethyl - S - (chloroformylmethyl) thiophosphate.—91 gm. of O,O - diethyl-S-(carboxymethyl) thiophosphate were introduced into 500 cc. of benzene. 51 cc. of oxalyl chloride were added over a period of 20 minutes to the solution thus obtained. The solution was heated to reflux for three hours until the end of the evolution of hydrochloric acid. 85.5 gm. of O,O-diethyl-S-(chloroformylmethyl) thiophosphate, or the acid chloride of O,O-diethyl-S-(carbomethyl) thiophosphate were obtained.

I.R. spectra: C=O 1770 cm.$^{-1}$; 1756 cm.$^{-1}$.

EXAMPLE 4

O,O-dimethyl-S-(di-n-propylsulfoximinocarbonylmethyl) dithiophosphate 28.5 gm. of di-n-propylsulfoximide and 19.3 gm. of triethylamine were introduced into 250 cc. of tetrahydrofuran. The solution thus obtained was cooled to 0° C. and a solution of 44.7 gm. of the acid chloride of O,O-dimethyl-S-(carboxymethyl) dithiophosphate (described in Belgium Pat. No. 740,759) in 100 cc. of tetrahydrofuran was introduced. The solution thus obtained was maintained under agitation at room temperature for one hour, and then filtered. The residue was empasted with tetrahydrofuran, vacuum filtered and the filtrate evaporated to dryness under reduced pressure. The residue obtained was subject to chromatography through silica eluting with a benzene-ethyl acetate mixture (7:3). 19 gm. of O,O - dimethyl-S-(di - n - propylsulfoximinocarbonylmethyl) dithiophosphate was obtained having a refractive index $n_D^{21}=1.5438$.

Analysis: $C_{10}H_{22}NO_4PS_3$; molecular weight=347.457. Calculated: 34.56% C; 6.38% H; 4.03% N; 8.92% P. Found: 35.3% C; 6.5% H; 4.3% N; 8.5% P.

Preparation of di-n-propylsulfoximide 78.5 cc. of sulfuric acid was introduced at 0° C. to 5° C. in a suspension of 39.2 gm. of di-n-propylsulfoxide (described by Searles et al., J. Org. Chem., 2028 [1958]) and 22.6 gm. of sodium azide in 400 cc. of chloroform. The mixture was left under agitation for 15 minutes at room temperature and then heated to 45° C. for 17 hours. The mixture was then poured into water, cooled, and the chloroform phase was separated. The aqueous phase was brought to a pH of 10 with sodium hydroxide and extracted with chloroform. The combined chloroform phases were dried over sodium sulfate, filtered and evaporated to dryness under reduced pressure. 29.1 gm. of di-n-propylsulfoximide was thus obtained having a refractive index $n_D^{25}=1.4795$.

EXAMPLE 5

Composition based on O,O-dimethyl-S-(dimethylsulfoximinocarbonylmethyl) dithiophosphate The ingredients hereafter listed are intimately mixed until a concentrated homogenous liquid was obtained:

|  | Percent |
|---|---|
| O,O - dimethyl - S - (dimethylsulfoximinocarbonylmethyl) dithiophosphate | 25 |
| "Atlox" 4851 [a] | 6.4 |
| "Atlox" 4855 [b] | 3.2 |
| Xylene | 65.4 |

[a] Mixture of alkylarylsulfonate and polyoxyethylene triglyceride, viscosity at 25° C.: 300–700 cps.
[b] Mixture of alkylarylsulfonate and polyoxyethylene triglyceride, viscosity at 25° C.: 1500–1900 cps.

In order to obtain a spray composition, this concentrate was mixed with water, the amount of water added being a function of the dose of active materials to be utilized.

EXAMPLE 6

Study of the acaricidal activity of O,O-dimethyl-S-(dimethylsulfoximinocarbonylmethyl) dithiophosphate indicated in the following as Compound A Test on *Tetranychus urticae*.—The present test has as its object the study of acaricidal properties of Compound A on the eggs and adult forms of *Tetranychus urticae*.

(1) Ovicidal test.—Bean leaves infested with 10 females of *Tetranychus urticae* per leaf and coated with glue at their peripheries were utilized. The females were allowed to lay eggs for 24 hours, then withdrawn. The leaves were thus infested with eggs and separated into three groups.

(a) A first group is treated with Compound A by spraying 0.5 ml. of an aqueous solution on each leaf, utilizing concentrations of 500, 50 and 10 mg. of Compound A per liter;

(b) A second group is treated with dicofol [2,2,2-trichloro-1,1-di-(4-chlorophenyl)-ethanol] by spraying each leaf with 0.5 ml. of an aqueous solution containing 50 mg. of dicofol per liter;

(c) A third group of leaves, or control group which is not treated.

The number of living eggs remained 9 days after the start of the treatment are counted. The results are expressed as a percentage of mortality of eggs and are shown in the following Table I:

TABLE I

| | Concentration in mg./l. | Percentage of mortality |
|---|---|---|
| Product utilized: | | |
| Compound A | 500 | 100 |
| | 50 | 100 |
| | 10 | 100 |
| Dicofol | 50 | 70.2 |
| Control leaves | 0 | 1.1 |

(2) Adulticidal test.—Bean leaves infested with 25 acarids per leaf and coated with glue at their peripheries were utilized. The bean leaves thus infested with acarids were separated into three groups:

(a) A first group was treated with Compound A by sprinkling 0.5 ml. of an aqueous solution of Compound A per leaf, while utilizing concentrations of 50, 25, 10, 5 and 1 mg. of Compound A per liter;

(b) A second group was treated with dicofol by sprinkling with 0.5 ml. of aqueous solution of dicofol per leaf, while utilizing concentrations of 25, 12.5, 10, 5 and 1 mg. of dicofol per liter;

(c) A third group of leaves or control group was not treated.

The number of living acarids was counted 48 hours after the spraying. The results obtained were expressed as a percentage of mortality and are given in the following Table II:

TABLE II

| | Concentration in mg./l. | Percentage of mortality |
|---|---|---|
| Product utilized: | | |
| Compound A | 50 | 100 |
| | 25 | 100 |
| | 10 | 100 |
| | 5 | 100 |
| | 1 | 91.0 |
| Dicofol | 25 | 100 |
| | 12.5 | 93.4 |
| | 10 | 99.0 |
| | 5 | 83.9 |
| | 1 | 35.0 |
| Control leaves | 0 | 1.1 |

Conclusion: Compound A possesses an excellent acaricidal activity which was very superior to that of dicofol.

The preceding specific embodiments are illustrative of the practice of the invention. It is to be understood, however, that other expedients known to those skilled in the art or disclosed herein may be employed without departing from the spirit of the invention or the scope of the following claims.

We claim:

1. Dialkylsulfoximinocarbonylmethyl thiophosphates having the formula $$\begin{array}{c} R_1O \\ \phantom{R_1O}\diagdown \\ \phantom{R_1O}\phantom{\diagdown}P-S-C-C-N=S \\ \phantom{R_1O}\diagup \\ R_2O \end{array} \begin{array}{c} X \\ \uparrow \\ \phantom{\uparrow} \\ \phantom{\uparrow} \end{array} \begin{array}{c} H \\ | \\ | \\ H \end{array} \begin{array}{c} \\ \| \\ O \end{array} \begin{array}{c} \\ \\ \downarrow \\ O \end{array} \begin{array}{c} R_3 \\ \diagup \\ \phantom{\diagup} \\ \diagdown R_4 \end{array}$$

wherein $R_1$, $R_2$, $R_3$ and $R_4$ are alkyl having from 1 to 7 carbon atoms and X represents a member selected from the group consisting of oxygen and sulfur.

2. The compound of claim wherein $R_1$, $R_2$, $R_3$ and $R_4$ are methyl, and X is sulfur.

3. The compound of claim 1 wherein $R_1$ and $R_2$ are ethyl, $R_3$ and $R_4$ are methyl, and X is sulfur.

4. The compound of claim 1 wherein $R_1$ and $R_2$ are ethyl, $R_3$ and $R_4$ are methyl, and X is oxygen.

5. The compound of claim 1 wherein $R_1$ and $R_2$ are methyl, $R_3$ and $R_4$ are n-propyl, and X is sulfur.

6. A process for the preparation of the dialkylsulfoximinocarbonylmethyl thiophosphates of claim 1 which consists essentially of reacting an acid halide having the formula

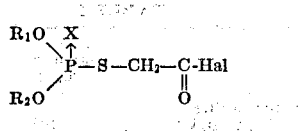

wherein $R_1$ and $R_2$ are alkyl having from 1 to 7 carbon atoms, X represents a member selected from the group consisting of oxygen and sulfur and Hal represents a halogen selected from the group consisting of chlorine and bromine, with a dialkylsulfoximide having the formula

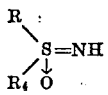

wherein $R_3$ and $R_4$ are alkyl having from 1 to 7 carbon atoms, and recovering said dialkylsulfoximinocarbonylmethyl thiophosphates.

References Cited

FOREIGN PATENTS 199,872  9/1967  U.S.S.R. _____ 260—943

OTHER REFERENCES

Konishi: Ann. Rept. Takeda Res. Lab., vol. 24 (1965), pp. 229–231.

LORRAINE A. WEINBERGER, Primary Examiner

R. L. RAYMOND, Assistant Examiner

U.S. Cl. X.R.

260—941, 984; 424—211